(12) United States Patent
Jojic et al.

(10) Patent No.: US 7,594,177 B2
(45) Date of Patent: Sep. 22, 2009

(54) SYSTEM AND METHOD FOR VIDEO BROWSING USING A CLUSTER INDEX

(75) Inventors: Nebojsa Jojic, Redmond, WA (US); Sumit Basu, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 875 days.

(21) Appl. No.: 11/007,978

(22) Filed: Dec. 8, 2004

(65) Prior Publication Data

US 2006/0120624 A1 Jun. 8, 2006

(51) Int. Cl.
*G06F 3/00* (2006.01)
(52) U.S. Cl. ............... 715/720; 715/721; 715/722; 715/723
(58) Field of Classification Search ......... 715/719–732; 707/100–102; 345/473
See application file for complete search history.

(56) References Cited

U.S. PATENT DOCUMENTS

| | | | |
|---|---|---|---|
| 6,546,146 B1* | 4/2003 | Hollinger et al. | 382/253 |
| 6,956,573 B1* | 10/2005 | Bergen et al. | 345/473 |
| 2002/0039136 A1* | 4/2002 | Okamoto et al. | 348/148 |
| 2003/0103670 A1* | 6/2003 | Schoelkopf et al. | 382/162 |
| 2003/0156757 A1* | 8/2003 | Murakawa et al. | 382/195 |
| 2004/0227768 A1* | 11/2004 | Bates et al. | 345/589 |
| 2005/0063575 A1* | 3/2005 | Ma et al. | 382/128 |
| 2005/0117017 A1* | 6/2005 | Baer | 348/87 |
| 2006/0133667 A1* | 6/2006 | Schoelkopf et al. | 382/162 |
| 2007/0019889 A1* | 1/2007 | Peter Miller et al. | 382/305 |

OTHER PUBLICATIONS

P. Anandan, M. Irani, M. Kumar, and J. Bergen. Video as an image data source: Efficient representations and applications. In Proceedings of IEEE ICIP, pp. 318-321, 1995.

A. Aner and J. R. Kender. Video summaries through mosaic-based shot and scene clustering. In Proc. European Conference on Computer Vision, 2002.

B.J. Frey and N. Jojic. Fast, large-scale transformation-invariant clustering. In Advances in Neural Information Processing Systems 14, Cambridge, MA: MIT Press, 2002.

(Continued)

*Primary Examiner*—Ba Huynh
(74) *Attorney, Agent, or Firm*—Lyon & Harr, LLP; Mark A. Watson

(57) ABSTRACT

A "Video Browser" provides an intuitive user interface for indexing, and interactive visual browsing, of particular elements within a video recording. In general, the Video Browser operates by first generating a set of one or more mosaic images from the video recording. In one embodiment, these mosaics are further clustered using an adjustable similarity threshold. User selection of a particular video mosaic then initiates a playback of corresponding video frames. However, in contrast to conventional mosaicking schemes which simply play back the set of frames used to construct the mosaic, the Video Browser provides a playback of only those individual frames within which a particular point selected within the image mosaic was observed. Consequently, user selection of a point in one of the image mosaics serves to provide a targeted playback of only those frames of interest, rather than playing back the entire image sequence used to generate the mosaic.

45 Claims, 6 Drawing Sheets

OTHER PUBLICATIONS

B.J. Frey and N. Jojic. Transformation-invariant clustering using the EM algorithm. IEEE Trans. Pattern Analysis and Machine Intelligence, 25(1), Jan. 2003.

A. Girgensohn and J. Boreczky. Time-constrained keyframe selection technique. In Proc. IEEE Multimedia Computing and Systems, 1999.

M. Irani, P. Anandan, and S. Hsu. Mosaic based representations of video sequences and their applications. In Proceedings of the 5th ICCV, pp. 605-611, Jun. 1995.

R. M. Neal and G. E. Hinton. A new view of the EM algorithm that justifies incremental, sparse and other variants. In M. I. Jordan, editor, Learning in Graphical Models, p. 355368. Norwell MA: Kluwer Academic Publishers, 1998.

N. Petrovic, N. Jojic, B. Frey, and T. Huang. Real-time on-line learning of transformed hidden Markov models from video. In Artificial Intelligence and Statistics, 2003.

M. Brown and D. Lowe, "Recongising panoramas," International conference on computer vision, 2003.

M. Irani and P. Anandan. Video Indexing Based on Mosaic Representations, Proceedings of the IEEE, 86:5, May 1998.

M. Flickner et.al. Query by Image and Video Content: The QBIC System. IEEE Comput. pp. 23-32, Sep. 1995.

Li, F. C., Gupta, A., Sanocki, E., He, L., Rui, Y. Browsing digital video, Microsoft Technical Report, MSR-TR-99-67, Sep. 20, 1999.

Y. Rui, T. S. Huang, and S. Mehrotra, "Constructing Table of Contents for Videos", ACM J. of Multimedia Systems, 1998.

* cited by examiner

SYSTEM AND METHOD FOR VIDEO BROWSING USING A CLUSTER INDEX

BACKGROUND

1. Technical Field

The invention is related to interactive browsing of video recordings, and in particular, to a system and method for providing interactive browsing of a video recording via user selection of points within panoramic images that are automatically generated from clusters of one or more frames of the video recording.

2. Related Art

Many video recordings typically record a variety of "scenes" throughout the duration of the video recording. Further, with many such recordings the camera often moves about or to point to different areas of particular scenes while the video is being recorded, thereby capturing an even larger number of scenes. Therefore, the amount of video data available to an average consumer can quickly become overwhelming as the number and length of those video recordings increase. Once the video has been recorded, a manual review of the video to determine whether anything of interest has occurred during the period of the recording is typically a time consuming process, especially for long video recordings. Similarly, where the user is looking for a particular scene, object, or event within the video, it can also be a time consuming process to locate that information within the video recording. Consequently, there is a need for efficient general-purpose tools to provide the user with a capability to quickly browse and navigate such video information, without requiring the user to actually watch the entire length of the video recording in reviewing the content of that video recording.

A number of conventional schemes have been implemented in an attempt to address this problem. For example, a number of partially or fully automated schemes based on the concept of video "key frames" have been advanced for retrieving and browsing video. In general, such schemes operate by identifying and extracting particular representative frames (i.e., key frames) in a video sequence which meet some predefined criteria, such as motion detection, target object detection, color detection, change detection, scene-cut or scene-change information, etc.

For example, conventional change detection methods, including for example, pixel-based and region-based methods, are a common way to detect events of interest in video recordings. Typically, such schemes use conventional frame-to-frame differencing methods in various algorithms for identifying the video key frames. In general, such change detection methods often use a threshold value to determine whether a region of an image has changed to a sufficient degree with respect to the background. Such change detection techniques have been further improved by applying "classical" morphological filters or statistically based morphological filters to "clean up" initial pixel level change detection, making detection thresholds more robust.

Regardless of what methods are used to identify the key frames, once they have been identified, there are number of schemes that have been adapted to organize the key frames into user selectable indexes back into the original video. For example, one conventional key frame based scheme organizes the key frames into interactive "comic books" comprised of a single frame-sized thumbnail for each scene. A similar scheme organizes the key frames into "video posters." In general, both of these schemes use different key frame layout schemes to provide the user with a number of user-selectable key frames that are indexed to the original video. In other words, the extracted key frames are typically presented as a series of individual thumbnail images to the user. Related schemes have implemented the concept of hierarchical key-frame clustering to group or cluster particular key-frames based on some similarity metric, thereby creating a cluster or group of theoretically similar video sequences. In any case, whether using individual or clustered key-frames, the user will then select a particular key frame (or cluster) as an entry point into the video so as to play back a portion of the video beginning at or near the time index associated with the selected key frame.

Unfortunately, one problem with such schemes is that conventional key-frame schemes tend to be profuse in unimportant details and insufficient for overall video understanding (only a frame-sized thumbnail per shot). Consequently, long lists of shots or scenes result in an information flood rather than an abstraction of the video recording. In other words, as the length of the video increases, the number of key frames also typically increases. As a result, typical key frame indices can be difficult or time consuming for a user to quickly review. Further, individual key-frame thumbnails are not typically sufficient for a user to judge the relevance of the content represented by that key-frame. In addition, user selection of a particular key frame will play back the entire video sequence associated with that key-frame, even where the user may only be interested in a particular element within the key-frame or video sequence.

Another approach uses the concept of image mosaics to provide video browsing and navigation capabilities to provide similar functionality to video key-frame schemes discussed above. In general, these mosaicing schemes typically generate static mosaic images from particular "scenes" within an overall video recording. In other words, image mosaics are generated from the set of sequential images represented by each scene. That mosaic is the presented to the user in the same manner as the video key-frame schemes described above. In fact, such mosaicing schemes are often simply extensions of conventional key-frame schemes.

For example, as noted above, each key frame provides a representative image as an index to a set of sequential image frames. The mosaicing schemes typically use that same set of image frames is to create the mosaic image, which then provides a visual index back to the same set of sequential image frames. In other words, the primary difference is that the same set of image frames is represented either by a representative thumbnail image (key-frame), or by thumbnail image mosaic. Unfortunately, in addition to having problems similar to those of conventional key-frame schemes, these conventional mosaicing schemes have additional problems, including, for example, constraints on camera motions and requirements that target scenes should be approximately planar and should not contain moving objects.

Still other video indexing schemes have attempted to summarize longer videos by generating a shorter video that preserves the frame rate of key elements of certain portions of the original video, while greatly accelerating portions of the video in which nothing of interest is occurring. These schemes are sometimes referred to as "video skimming" techniques. Such schemes often focus on extracting the most "important" aspects of a video into summary clips that are then concatenated to form the video summary or "skim." However, even such video skimming techniques can result in lengthy representations of an overall video recording, especially where the length of the video increases and the number of events of interest within the video increases.

Therefore, what is needed is a system and method which models the sources of information content in a video recording to provide the user with an overview or summary of the contents of the video. In addition, such a system and method should implement an intuitive video navigation interface that provides the user with a direct entry into particular points or segments within the overall video recording. These particular points or segments should correspond to particular elements or features of video scenes, for targeting playback of only those frames of interest, rather than merely providing a playback of an entire scene corresponding to a selected key-frame or mosaic as with conventional browsing and navigation schemes.

SUMMARY

A "Video Browser," as described herein, operates to solve the aforementioned problems by providing an intuitive user interface for indexing, and interactive visual browsing, of particular elements within a video recording. In general, the Video Browser operates by first generating a set or cluster of one or more panoramic mosaic images from similar frames, shots, or scenes located in the video recording. These mosaics are then presented in an interactive graphical user interface. User selection of one of the mosaics then initiates a playback of corresponding video frames. However, in contrast to conventional mosaicing schemes which simply play back the set of frames used to construct the mosaic, the Video Browser provides a playback of only those individual frames within which a particular point selected within the image mosaic was observed. Similarly, in one embodiment, this concept is also extended to particular objects identified within the video. Consequently, user selection of a point (or object) in one of the image mosaics serves to provide a targeted playback of only those frames of interest, rather than playing back the entire image sequence used to generate the mosaic.

Therefore, the Video Browser described herein generates panoramic image mosaics which include an embedded frame index back to corresponding frames, and/or objects, in the original video recording. In other words, every pixel of the mosaic image includes a pointer to every image frame which contributed to the generation of that pixel in the image mosaic. Therefore, user selection of any pixel will initiate a playback of the corresponding image frames. In a related embodiment, a positioning tolerance is used such that the image frames corresponding to all pixels within some range or distance from the selected pixel will be played back.

For example, in the case where a video recording captures a particular individual in a particular setting, and then pans around the surrounding area such that the individual repeatedly comes in and out of view over a number of frames, user selection of a point within the mosaic image which includes a representation of that person will serve to initiate a playback of only those image frames within which the person exists. In contrast, conventional schemes typically provide a playback of the entire image sequence used to generate the mosaic. Consequently, the mosaics described herein provide an index into not only particular image frames in the video recording, but also an index into particular objects within the video recording.

Playback of the image frames corresponding to the selected pixel or pixels of the image mosaic is chronological, but not necessarily immediately sequential. In other words, the image frames corresponding to the selected pixels are played back in the order in which they were recorded. However because the video recording may include a moving camera, or moving objects within a particular scene, any two contiguous image frames do not necessarily each include information which contributed to a particular pixel in the image mosaic. Consequently, by keeping track of this information when constructing the mosaic images, the user interface is able to automatically limit the playback of image frames to only those image frames that actually contributed to the selected pixel or region. This is true even though the overall mosaic image from which a particular pixel or region was selected may have been constructed from a larger number of image frames.

Further, in a related embodiment, clusters of similar shots or scenes (and thus similar mosaics images) are used to create supersets of one or more composite mosaics, or "mosaic clusters" which are represented by a single panoramic image mosaic. In other words, each mosaic cluster corresponds to a set of loosely connected views of some physical area or object (each of which may be separately represented by an image mosaic) which are combined to create composite mosaics representing the mosaic cluster. The mosaic clusters are then treated in the same manner as the individual mosaic images with respect to initiating playback of corresponding image frames from the video recording.

For example, in one embodiment, the mosaic clusters (i.e., image mosaics created from two or more similar mosaic images) are created by combining two or more image mosaics (or even mosaic clusters) that include approximately similar frames by loosening or reducing a cluster or frame similarity threshold. Conversely, in a related embodiment, the mosaic clusters are expanded back into their constituent image mosaics (potentially up to the individual frame level) by tightening or raising the cluster or frame similarity threshold. Further, in related embodiments, particular mosaics are individually selectable for creating mosaic clusters, or for expanding the mosaics or mosaic clusters into additional mosaic images.

Clearly, collapsing multiple image mosaics into a single mosaic cluster serves to reduce the number of visible mosaics presented in the graphical user interface, while expanding a mosaic cluster will increase the number of visible mosaics presented in the graphical user interface. Consequently, in various embodiments, a scroll bar, or the like, is provided to scroll through the various mosaics if there is insufficient room to simultaneously display all of the image mosaics within one window. Alternately in a related embodiment, the size of the image mosaics (and mosaic clusters) is scaled to fit the mosaics into an available space within the graphical user interface.

In view of the above summary, it is clear that the Video Browser described herein provides a unique system and method for indexing and browsing particular elements of interest in video recordings. In addition to the just described benefits, other advantages of the Video Browser will become apparent from the detailed description which follows hereinafter when taken in conjunction with the accompanying drawing figures.

DESCRIPTION OF THE DRAWINGS

The specific features, aspects, and advantages of the present invention will become better understood with regard to the following description, appended claims, and accompanying drawings where:

DETAILED DESCRIPTION OF THE PREFERRED EMBODIMENTS

In the following description of the preferred embodiments of the present invention, reference is made to the accompanying drawings, which form a part hereof, and in which is shown by way of illustration specific embodiments in which the invention may be practiced. It is understood that other embodiments may be utilized and structural changes may be made without departing from the scope of the present invention.

Figure 1:
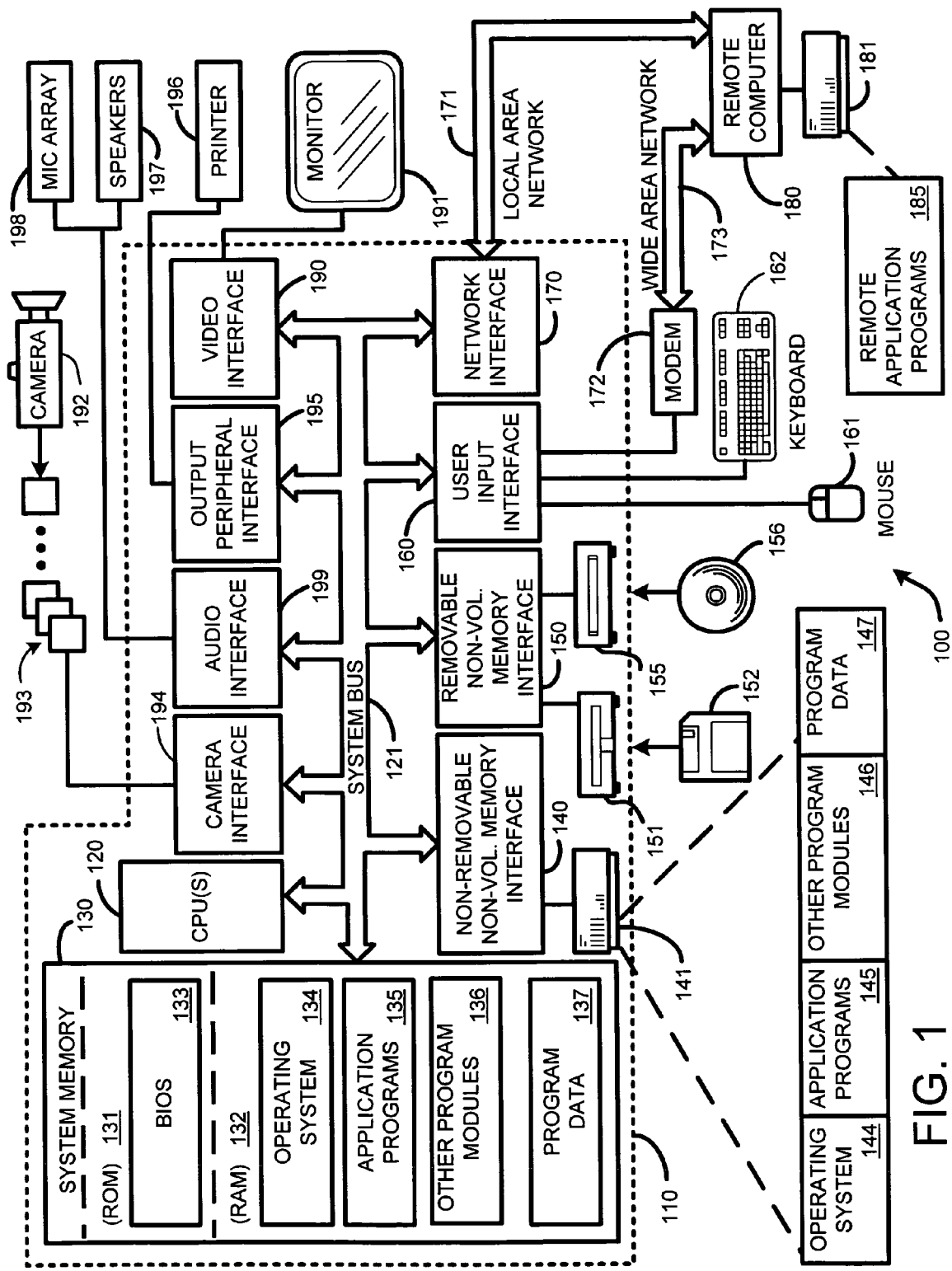
FIG. 1 is a general system diagram depicting a general-purpose computing device constituting an exemplary system implementing a Video Browser, as described herein.

1.0 Exemplary Operating Environment:

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer in combination with hardware modules, including components of a microphone array 198. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. With reference to FIG. 1, an exemplary system for implementing the invention includes a general-purpose computing device in the form of a computer 110.

Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules, or other data.

Computer storage media includes, but is not limited to, RAM, ROM, PROM, EPROM, EEPROM, flash memory, or other memory technology; CD-ROM, digital versatile disks (DVD), or other optical disk storage; magnetic cassettes, magnetic tape, magnetic disk storage, or other magnetic storage devices; or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball, or touch pad.

Other input devices (not shown) may include a joystick, game pad, satellite dish, scanner, radio receiver, and a television or broadcast video receiver, or the like. These and other input devices are often connected to the processing unit 120 through a wired or wireless user input interface 160 that is coupled to the system bus 121, but may be connected by other conventional interface and bus structures, such as, for example, a parallel port, a game port, a universal serial bus (USB), an IEEE 1394 interface, a Bluetooth™ wireless interface, an IEEE 802.11 wireless interface, etc. Further, the computer 110 may also include a speech or audio input device, such as a microphone or a microphone array 198, as well as a loudspeaker 197 or other sound output device connected via an audio interface 199, again including conventional wired or wireless interfaces, such as, for example, parallel, serial, USB, IEEE 1394, Bluetooth™, etc.

A monitor 191 or other type of display device is also connected to the system bus 121 via an interface, such as a video interface 190. In addition to the monitor 191, computers may also include other peripheral output devices such as a printer 196, which may be connected through an output peripheral interface 195.

Further, the computer 110 may also include, as an input device, a camera 192 (such as a digital/electronic still or video camera, or film/photographic scanner) capable of capturing a sequence of images 193. Further, while just one camera 192 is depicted, multiple cameras of various types may be included as input devices to the computer 110. The use of multiple cameras provides the capability to capture multiple views of an image simultaneously or sequentially, to capture three-dimensional or depth images, or to capture panoramic images of a scene. The images 193 from the one or more cameras 192 are input into the computer 110 via an appropriate camera interface 194 using conventional interfaces, including, for example, USB, IEEE 1394, Bluetooth™, etc. This interface is connected to the system bus 121, thereby allowing the images 193 to be routed to and stored in the RAM 132, or any of the other aforementioned data storage devices associated with the computer 110. However, it is noted that previously stored image data can be input into the computer 110 from any of the aforementioned computer-readable media as well, without directly requiring the use of a camera 192.

The computer 110 may operate in a networked environment using logical connections to one or more remote computers, such as a remote computer 180. The remote computer 180 may be a personal computer, a server, a router, a network PC, a peer device, or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environment having now been discussed, the remaining part of this description will be devoted to a discussion of the program modules and processes embodying a "Video Browser" which provides a mosaic-based graphical user interface for indexing and interacting with video recordings.

2.0 Introduction:

A "Video Browser," as described herein, provides an intuitive user interface for interacting with video recordings via user interaction with a set of one or more panoramic mosaics constructed from sets or clusters of one or more similar frames, shots, or scenes located in the video recording. In particular, this user interface provides visual scene indexing, and interactive visual browsing, of particular elements, including similar areas and objects, within the video recording through user selection of points or regions within the mosaic images generated from the video recording. User selection of a particular video mosaic then initiates a playback of corresponding video frames. However, in contrast to conventional mosaicing schemes which simply play back the set of frames used to construct the mosaic, the Video Browser provides a playback of only those individual frames within which a particular point selected within the image mosaic was observed. Similarly, in one embodiment, this concept is also extended to particular objects identified within the video. Consequently, user selection of a point (or object) in one of the image mosaics serves to provide a targeted playback of only those frames of interest, rather than playing back the entire image sequence used to generate the mosaic.

In general, video recordings are typically represented by at least three levels of organization, including individual image frames, shots, and scenes. In general, a shot is an unbroken sequence of image frames recorded from a single camera. It is the building block of the overall video recording, and is typically delimited by shot boundaries, which are either embedded as metadata in the video recording, or are detectable using conventional shot detection techniques, including pixel based, statistics based, transform based, feature based, and histogram based, shot detection methods that are well known to those skilled in the art. Further, a scene is typically defined as a collection of semantically related and temporally adjacent shots depicting and conveying a high level concept or story. While the shot is the building block of the video recording, it is the scene that generally conveys the semantic meaning of the video to the viewers. However, because particular scenes often include a number of very different shots, it often makes more sense to cluster similar shots than to cluster similar scenes.

Further, in the context of home video recordings, the concept of a "scene" becomes somewhat fuzzier. In particular, many home video type recordings tend to be a collection of unrelated or loosely related collections of shots which may or may not cover the same physical locations, objects, or people, in different shots. For example, the scenes in home video recordings are typically are tied together more by space than time, since a user often pans the video camera in a broad range in trying to catch "all the action." Users may also stop the camera and restart it again in the same scene with a slightly offset location. Further, users may go off to film something else and then come back to that scene, etc. All these issues regarding home video type recordings require for a system and method that takes advantage of spatial similarity to cluster the appropriate frames together for a logical scene, as does the Video Browser described herein. In any case, as noted above, the Video Browser is fully capable of using sets or clusters of one or more similar frames, shots, or scenes located in the video recording for constructing the panoramic mosaics. Therefore, any discussion of clustering of frames, shots, or scenes provided herein should be understood to apply to each of the aforementioned cases.

In addition, throughout the following discussion, reference is made to computer pointing devices, and the like. However, it should be understood that such reference is intended to include a variety of conventional pointing and selection devices for controlling and interacting with a user interface. Such devices include, for example, keyboard scroll controls (left/right/up/down buttons), conventional gamepad type devices, various keyboard cursor controls (either predefined or user programmable), a joystick, a touchpad, etc. Therefore, in view of the preceding definition, the use of the term "pointing device," "pixel selection device," or reference to control of a pointer, curser, or computer pointer of any kind, or of user selection via a user interface, should be understood to include any or all of the aforementioned user interface control methods, as well as other conventional user interface control methods which are not explicitly cited herein.

2.1 System Overview:

As noted above, the Video Browser described herein provides a user interface for visual scene indexing, and interactive visual browsing, of particular elements, such as particular locations or objects, within the video recording through user selection of points or regions within mosaic images generated from the video recording. While the video recording or stream can be provided from any source, in the simplest embodiment, the Video Browser operates in combination with one or more conventional video cameras to capture and record the video stream that is to be processed by the Video Browser. However, it should be appreciated that video streams from any conventional source, including, for example, satellite video imagery, television broadcasts, and network or Internet broadcast video streams, are also applicable for use with the Video Browser described herein. Therefore, for purposes of explanation, all such video streams will be generically referred to throughout this description as "video recordings," or simply as "videos."

In general, the Video Browser operates to populate a graphical user interface with a set of automatically generated panoramic video mosaics. These panoramic mosaic images represent, and are constructed from, various similar or at least partially matching sequences of image frames, shots, or scenes which are clustered into sets of image frames once they have been identified in the video recording. Once one or more sets of similar image frames or sequences have been identified, conventional panoramic image mosaics are generated from the sets of image sequences. These mosaic images are then graphically presented to the user as an interactive visual interface into corresponding frames (or objects) of the original video recording. Note that the construction of panoramic mosaics from a video recording is a concept that is well known to those skilled in the art, and will therefore not be described in detail herein.

In one embodiment, each panoramic image mosaic presented via the user interface includes an embedded frame index, which can be considered as embedded metadata. This frame index points back to corresponding frames, and/or objects, in the original video recording. In other words, every pixel of the mosaic image includes a pointer to every image frame which contributed to the generation of that pixel in the image mosaic. Therefore, user selection of any pixel will initiate a playback of the corresponding image frames. In a related embodiment, a positioning tolerance is used such that the image frames corresponding to all pixels within some range or distance from the selected pixel are played back in response to the user selection of the selected region of the panoramic image mosaic. One advantageous feature of this embodiment is that a simple user mouse-over of particular image pixels will immediately initiate playback of the corresponding images frames, as described in further detail below.

Further, it should be noted that the image frames corresponding to the selected pixels are played back in the order in which they were recorded. However because the video recording may include a moving camera, or moving objects within a particular scene, or may simply return to particular scenes at various points in the recording, any two contiguous image frames do not necessarily both include information which contributed to a particular pixel in the image mosaic based on the aforementioned similarity analysis.

Figure 2:
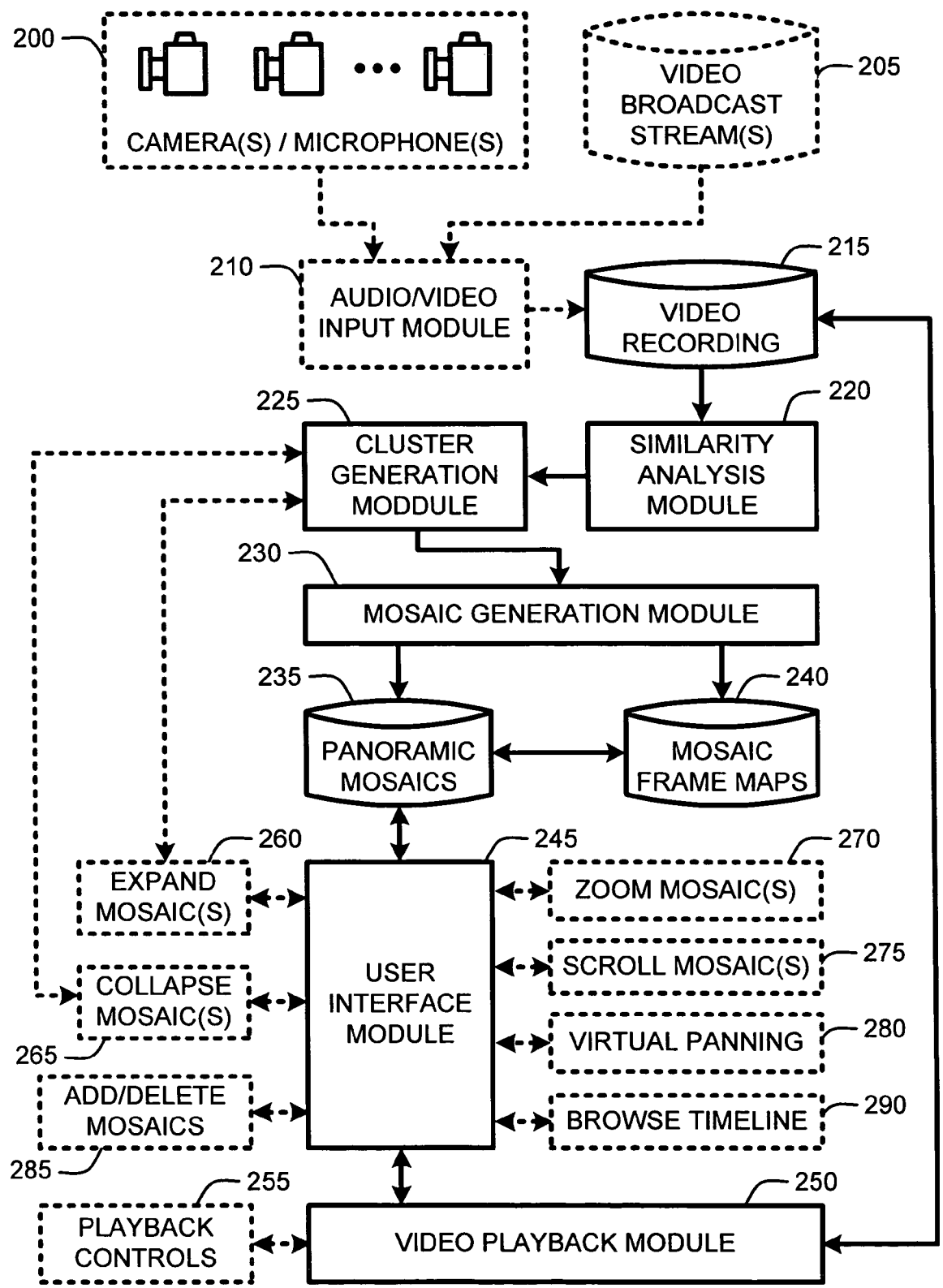
FIG. 2 illustrates an exemplary architectural system diagram showing exemplary program modules for implementing a Video Browser, as described herein.

2.2 System Architectural Overview:

The processes summarized above are illustrated by the general system diagram of FIG. 2. In particular, the system diagram of FIG. 2 illustrates the interrelationships between program modules for implementing the user interface provided by the Video Browser, as described herein. It should be noted that any boxes and interconnections between boxes that are represented by broken or dashed lines in FIG. 2 represent alternate embodiments of the Video Browser described herein, and that any or all of these alternate embodiments, as described below, may be used in combination with other alternate embodiments that are described throughout this document.

In general, as illustrated by FIG. 2, the Video Browser generally operates by processing a video recording 215 for populating a user interface with mosaic images. The video recording 215 can be provided from any conventional source, including one or more video cameras 200 (with microphones, if desired) to capture one or more video streams which are provided to an audio/video input module 210 via a conventional computer interface. In another embodiment, rather than directly using one or more cameras 200 to provide input to the audio/video input module 210, one or more prerecorded video streams 205, such as, for example, a television or Internet broadcast video stream, or simply a prerecorded video tape, are instead provided to the audio/video input module 210.

Regardless of the source of the video recording 215, once received, it is provided to a similarity analysis module 220 for identifying similar images frames, shots, or scenes in the video recording. Once the similarities have been determined, a cluster generation module 225 operates to form sets or groups of similar image frames. It should be noted that rather than actually extracting these frames from the video recording 215, these clusters or groups can simply be identified by a frame index which represents the individual frames belonging to each frame cluster. Further, it should also be noted that in one embodiment, as described in further detail in Section 3.3, the clustering determination is hierarchical such that the relationship or similarity of each cluster is known with respect to each other cluster. Consequently, expanding or collapsing particular clusters (and thus the corresponding panoramic mosaic images) with respect to a similarity threshold is provided in various embodiments of the Video Browser, as described herein.

Given the various clusters of similar image frames, a mosaic generation module 230 then operates to construct a panoramic mosaic image 235 from each cluster of image frames. It should be noted that generating a panoramic mosaic image 235 from a set of image frames extracted from a video recording 215 is a technique that is well known to those skilled in the art, and will not be described in detail herein. Further, in embodiments using hierarchical clustering, panoramic mosaic images 235 are pre-computed for each level of clustering so that expanding or collapsing the corresponding panoramic mosaic images into more or fewer panoramic mosaic images, respectively, is accomplished in real-time by simply selecting from the pre-computed mosaics at the selected level of clustering.

In addition to constructing the panoramic mosaic images 235, the mosaic generation module 230 also generates a corresponding mosaic frame map 240 for each of the panoramic mosaic images 235 (for each level of clustering). As described in further detail below, these mosaic frame maps 240 are used as an interactive index back to the particular image frames in the original video recording 215. In other words, these frame maps 240 include pixel-level pointers which point to the frames from which each specific pixel was generated when creating the panoramic mosaic images 235.

Once the panoramic mosaic images 235 and their corresponding frame maps 240 have been generated, this information is provided to a user interface module 245 for presenting the information to the user. In particular, as a minimum, the user interface module 245 presents a graphical user interface window for displaying the panoramic mosaic images 235, with the corresponding mosaic frame maps 240 being overlaid on the pixels of each corresponding panoramic mosaic image so that user selection of any pixel (or region) of a particular panoramic mosaic image will serve to initiate playback of the corresponding image frames via a video playback module 250. The video playback module 250 provides playback of the video frames in a video playback window using conventional video playback techniques. In one embodiment, the video playback module 250 also includes a suite of conventional video playback controls 255, such as, for example, controls for pause, play, stop, fast forward, etc.

In additional embodiments, the user interface module 245 includes additional features for interacting with the panoramic mosaic images 235. For example, as noted above, the Video Browser provides a capability to expand or collapse the clusters used to generate the panoramic mosaic images 235. To implement this embodiment, various embodiments of the user interface module 245 include controls for expanding mosaics 260, and collapsing mosaics 265. Implementation of these controls is provided via the graphical user interface of the Video Browser by using controls such as, for example, context sensitive menus associated with each panoramic mosaic images, a similarity threshold slider bar or other adjustment control, or simply buttons or the like for expanding or collapsing one or all of the panoramic mosaic images 235.

As noted above, in one embodiment, the panoramic mosaic images 235 are used to populate a graphical user interface window. In order to accomplish this without suing excessive space, the panoramic mosaic images 235 are presented as a set of user selectable thumbnails. Consequently, in the case that the user wants to see a larger version of one or more of the thumbnails representing the panoramic mosaic images 235, the user interface module 245 includes a capability to set a zoom 270 (in or out) for one or more of the panoramic mosaic image thumbnails.

In the case of video recording of long duration, or where there are a larger number of non-similar scenes, there may be a large number of panoramic mosaic images 235. Consequently, displaying these panoramic mosaic images 235 in the graphical user interface window of the Video Browser requires either that that the size of the panoramic mosaic images 235 is decreased to allow all of the panoramic mosaic images to fit in the window, or that window containing the panoramic mosaic images is scrollable 275, so as to allow user scrolling of the mosaic thumbnails.

Another embodiment enabled by the Video Browser is the concept of virtual panning 280. Virtual panning 280 enables the user to simultaneously pan through the video recording in both time and space by simply moving a pointing device, such as a computer mouse or trackball pointer, across one of the panoramic mosaic images 235. In particular, as discussed above, each of the panoramic mosaic images 235 includes a frame map 240 which points back to the image frames used to generate each pixel of the corresponding panoramic mosaic images 235. Consequently, in this embodiment, when the user positions the pointer anywhere in the panoramic mosaic images 235, the video playback module 250 automatically begins to play the image frames used to generate the pixel corresponding to the current pointer position.

Then, when the user moves the pointer, the video playback module 250 automatically begins to play the image frames used to generate the pixel corresponding to the new pointer position. However, because spatially close pixels in a panoramic mosaic image 235 are likely to have been generated from one or more of the same image frames, the Video Browser begins playback of the image frames used to generate the pixel corresponding to the new pointer position from a temporal position (e.g. the frame index of the video recording) that is closest to temporal position of the last frame played corresponding to the previous pointer position. In other words, the virtual panning 280 capability provides the user with simultaneous spatial and temporal browsing of the video recording.

In yet another embodiment, the user interface 245 provides a capability to add or delete particular panoramic mosaic images 235 to the graphical user interface window in which the panoramic mosaic images are displayed. The capability to add panoramic mosaic images 235 includes the ability to import particular panoramic mosaic images from other video recordings 215. Consequently, one advantage of this embodiment is to provide the user with the ability to easily create "video scrapbooks" for a plurality of unique video recordings. In this case, one or more of the panoramic mosaic images 235 may represent a different video recording 215. Further, since each panoramic mosaic image 235 includes a mosaic frame map, those panoramic mosaic images still point back to the original image frames used to construct the panoramic mosaic images. Consequently, playback of the corresponding frames is accomplished in exactly the same manner as if all of the panoramic mosaic images 235 were constructed from the same video recording 215.

In still another embodiment, a timeline indicator is included in the graphical user interface provided by the user interface module 245. This time line indicator serves two purposes. First, it provides a visual indication of the temporal position of each frame in the entire length of the video recording that corresponds to the currently selected point or pixel of the panoramic mosaic image 235. Second, this timeline indicator provides the capability to browse 290 the timeline of the video recording. In particular, user selection of a position along the timeline will initiate playback of the original video recording from a temporal location corresponding to the currently selected position along the timeline.

3.0 Operation Overview:

The above-described program modules are employed for implementing the Video Browser described herein. As summarized above, this Video Browser provides a system and method for indexing and interacting with video recordings via a collection of panoramic mosaic images. The following sections provide a detailed discussion of the operation of the Video Browser, and of exemplary methods for implementing the program modules described in Section 2 in view of the operational flow diagram of FIG. 3 which is presented following a detailed description of the operational elements of the Video Browser.

3.1 Operational Details of the Video Browser:

The following paragraphs detail specific operational embodiments of the Video Browser described herein. In particular, the following paragraphs describe sources and types of video recordings or streams for use with the Video Browser; conventional scene similarity analysis techniques; and generation of panoramic video mosaics with embedded frame indices.

3.2 Physical Cameras and Video Streams:

As noted above, any of a number of conventional camera types or video feeds may be used in combination with the Video Browser. In fact, virtually any video camera or video stream feed which is capable of being interfaced with a computer, and by extension to the Video Browser, may be used. In fact, the easy availability of relatively inexpensive and high resolution video cameras is an important factor in the portability of the Video Browser. Further, newer video cameras can typically be connected directly to a computer's existing ports (USB interfaces, IEEE 1394 interfaces, Bluetooth™ wireless interfaces, IEEE 802.11 wireless interfaces, etc). Any such camera can be used by the Video Browser. Similarly, video feeds from television broadcasts, network or Internet broadcasts, or from satellite-based video imaging devices are also fully compatible with the Video Browser described herein.

3.3 Conventional Similarity Analysis Techniques:

A number of well known conventional techniques have been developed for determining shot and scene boundaries, and for clustering similar frames, shots or scenes. Further, many of these techniques are capable of identifying similar frames, shots, or scenes, whether or not they are temporally adjacent in the video recording. In fact, many of these conventional similarity analysis techniques are already integrated with some of the conventional mosaicing techniques discussed below. With respect to identifying similar image frames, shots, or scenes, such techniques include, for example, frame differencing, the use of color histograms, key frame detection, probabilistic scene modeling, etc, to name only a few of the conventional techniques.

In one embodiment, the Video Browser uses one or more of the aforementioned conventional techniques to identify similar frames, shots, or scenes. Note that for purposes of explanation, the discussion provided herein will generally refer to clustering similar "scenes." However, it should be understood that in the context of the description provided herein, the discussion of clustering of various scenes should be interpreted to include clustering at any level, including classically defined image frames, shots or scenes. These clusters are then generally referred to as "frame clusters." Note that since these similarity analysis and clustering techniques are well known to those skilled in the art, they will not be described in detail herein.

Further, it should also be noted that in one embodiment, the clustering determination is hierarchical such that the relationship or similarity of each cluster is known with respect to each other cluster. In other words, the initial clustering determination is hierarchical such that the relationship or similarity of each cluster is known with respect to each other cluster. Consequently, expanding or collapsing particular clusters (and thus the corresponding panoramic mosaic images) with respect to a similarity threshold is provided in various embodiments of the Video Browser, as described herein. For example, by pre-computing various levels of cluster similarity, and then generating corresponding panoramic mosaic images at each level of similarity, the Video Browser is capable expanding or collapsing the corresponding panoramic mosaic images into more or fewer panoramic mosaic images, respectively, in real-time by automatically populating the graphical user interface with panoramic mosaic images selected from the pre-computed mosaics at the selected similarity level.

3.4 Image Mosaics:

As discussed in the preceding sections, identification of clusters or sets of similar scenes is accomplished using conventional techniques, Regardless of what techniques are used to identify the clusters of similar scenes (or shots or frames) of the video recording, the corresponding image frames are then used to construct the panoramic image mosaics, which are in turn used in populating the graphical user interface of the Video Browser.

Generation of a mosaic from a set or cluster of similar or related image frames is a concept that is well known to those skilled in the art, and will be only generally described herein. In general, the basic idea of conventional mosaicing techniques is to obtain a wide field of view (FOV) or panoramic image of a scene given a set or sequence of image frames. This panorama is generally constructed by capturing images as a camera moves and then stitching the images together to obtain a larger image. In the case of the Video Browser described herein, rather than simply using adjacent frames captured from a moving camera to construct the panoramic image mosaic, the mosaics are instead constructed from the sets or clusters of frames identified as being similar, as described above.

For example, many digital cameras come bundled with software for automatically constructing panoramic image mosaics from images acquired from the cameras. In general, the geometry of the mosaicing problem for digital cameras is well understood, and typically consists of estimating a relatively small camera matrix or homography for each image. This estimation process is typically initialized by ordering the images, either automatically, or via user input. For example, one conventional mosaicing application requires a horizontal or vertical sweep, or a square matrix of images. Another conventional mosaicing application provides a user interface for roughly positioning the images before providing automatic registration of the images to construct the mosaic.

However, there are a number of conventional mosaicing schemes that provide both automatic image matching and geometry estimation. These conventional mosaicing schemes frequently use either feature-based or direct methods. Conventional feature-based methods typically begin by establishing correspondences between points, lines or other geometric entities detected in the image. For example, a typical feature-based approach would be to extract Harris corners and use a normalized cross-correlation of the local intensity values to match them. Direct methods differ from feature-based methods in that the direct methods attempt to iteratively estimate the camera parameters by minimizing an error function based on the intensity difference in the area of overlap. Direct methods have the advantage that they use all of the available data and hence can provide very accurate registration. However, one disadvantage to such methods is that they depend on a 'brightness constancy' assumption which may not hold true. Further, such methods typically also require initialization.

Many of the aforementioned feature-based and direct mosaicing methods are not typically capable of dealing with issues such as image zoom, change in illumination, or images which are not part of the sequence. However, a number of conventional mosaicing techniques make use of invariant features for object recognition and matching. Such invariant features can be found more repeatedly and matched more reliably than traditional methods such as cross-correlation using Harris corners. Harris corners are not invariant to scaling of the image, and cross-correlation of image patches is not invariant to rotation. However invariant features are designed to be invariant to these transformations.

For example, a number of conventional mosaicing techniques use "Scale Invariant Feature Transforms" or "SIFT" features for generating image mosaics. In general, as is known to those skilled in the art, SIFT features are geometrically invariant under similarity transforms and invariant under affine changes in intensity. These features are matched using various techniques, including, for example, approximate nearest neighbor (ANN) algorithms. Such techniques have also been used to match features in the context of structure derived from detected motion in images. Another related conventional mosaicing technique uses panoramic image geometry in combination with a probabilistic model for image match verification. Once the features have been matched between the various images, the mosaic images are typically constructed using conventional blending techniques to provide smooth transitions between the images, even in the case where there are intensity changes between the images, while preserving sharp detail, even in the presence of small registration errors between the various images.

It should be noted that the mosaicing techniques summarized above are only a few of a very large number of conventional techniques. As discussed above, any conventional mosaicing technique is capable of being adapted for use by the Video Browser described herein.

3.4.1 Mosaic Clusters and Hierarchical Clustering:

As noted above, the mosaic images are constructed from sets of similar image frames, corresponding to similar frames, shots, or scenes. However, in one embodiment, the mosaic images (or the underlying image frames used to generate those mosaics) are themselves clustered to create supersets of one or more composite mosaics, or "mosaic clusters" which are represented by a single panoramic image mosaic, based on a similarity between the individual mosaics. In other words, clustering is hierarchical such that each mosaic cluster corresponds to a set of loosely connected views of some physical area or object (each of which may be separately represented by a similar image mosaic) which are combined to create composite mosaics representing the mosaic cluster. Note that the similarity of individual image mosaics is determined in the same manner as that used to determine similarity of different scenes in the original video recording.

The mosaic clusters are then treated in the same manner as the individual mosaic images with respect to initiating playback of corresponding image frames from the video recording. In general such mosaic clusters are created in the same manner as used to create the constituent mosaic images, with the only difference being the use of a larger set of image frames (corresponding to each of the mosaic clusters used to construct the individual mosaics clustered to generate the mosaic cluster).

For example, in one embodiment, the mosaic clusters (i.e., image mosaics created from two or more similar mosaic images or clusters of similar image frames) are created by combining two or more image mosaics (or even mosaic clusters) that include similar frames by loosening or reducing a cluster or frame similarity threshold. Conversely, in a related embodiment, the mosaic clusters are expanded back into their constituent image mosaics (potentially up to the individual frame level) by tightening or raising the cluster or frame similarity threshold. Further, in related embodiments, particular mosaics are individually selectable for creating mosaic clusters, or for expanding the mosaics or mosaic clusters into additional mosaic images.

Clearly, collapsing multiple image mosaics into a single mosaic cluster serves to reduce the number of visible mosaics presented in the graphical user interface, while expanding a mosaic cluster will increase the number of visible mosaics presented in the graphical user interface. Consequently, in various embodiments, a scroll bar, or the like, is provided to scroll through the various mosaics if there is insufficient room to simultaneously display all of the image mosaics within one window. Alternately in a related embodiment, the size of the image mosaics (and mosaic clusters) is scaled to fit the mosaics into an available space within the graphical user interface.

3.4.2 Mosaic Metadata Maps (Embedded Frame Index):

As noted above, the mosaic images are created from a set of image frames determined to be sufficiently similar to be grouped or clustered together. Consequently, since the video frames comprising each mosaic are known, an index back to each frame is embedded in the panoramic mosaic as a user selectable map (i.e., embedded metadata). Consequently, user selection of any image pixels (or pixel ranges) of one of the mosaics via the user interface initiates playback of the corresponding video frame or frames. In one embodiment, this user selection of pixels is accomplished by simply monitoring pointer device position relative to the mosaic images. In other words, a simple user "mouse-over" of particular image pixels will immediately initiate playback of the corresponding images frames.

However, mosaics typically are larger in size than the individual image frames that are used to generate the mosaics. Consequently, each individual pixel in the mosaic will typically be created from some subset of the total number of image frames used to create each panoramic mosaic image. Therefore, the user selectable map embedded as metadata in each panoramic mosaic image includes a pointer to the specific image frames that actually contributed to the selected pixel. In a related embodiment, a positioning tolerance is used such that the image frames corresponding to all pixels within some range or distance from the selected pixel will be selected by playback.

Further, as discussed above, similarity of image frames, shots, or scenes, is not exclusively a function of the frames being sequential. In fact, it should be clear that similar frames may be found in numerous discrete portions of the video recording, and which may be significantly separated in time. Consequently, the user selectable map embedded in each panoramic mosaic image allows the user to simultaneously navigate the video recording both spatially and temporally.

In other words, user selection of a particular pixel or region of a mosaic initiates a chronological, but not necessarily adjacent, playback of the contributing video frames. In other words, the image frames corresponding to the selected pixels are played back in the order in which they were recorded. However because the video recording may include a moving camera, or moving objects within a particular scene, any two contiguous image frames do not necessarily both include information which contributed to a particular pixel in the image mosaic. Consequently, by keeping track of this information when constructing the mosaic images, and then embedding the information into each mosaic as a user selectable map, the user interface automatically limits the playback of image frames to only those image frames that actually contributed to the selected pixel or region. This is true even though the overall mosaic image from which a particular pixel or region was selected may have been constructed from a larger number of image frames.

For example, in the case where a video recording captures a particular individual in a particular setting, and then pans around the surrounding area such that the individual repeatedly comes in and out of view over a number of frames, user selection of a point within the mosaic image which includes a representation of that person will serve to initiate a playback of only those image frames within which the person exists. Note that this selective playback of frames holds true regardless of when in the video those images were recorded, and regardless of whether the frames provided for playback are sequential, or are separated by other frames which did not contribute to the selected pixel. In contrast, conventional schemes typically provide a playback of the entire image sequence used to generate the mosaic. Consequently, the mosaics described herein provide an index into not only particular image frames in the video recording, but also an index into particular objects within the video recording.

3.5 Audio Component of the Video Recording:

Many video recordings include an audio component that is synchronized to the image frames. In other words, as is well known to those skilled in the art, the image frames of a video recording frequently include a sound track which is tied to particular image frames for playback purposes.

In one embodiment, the Video Browser provides a synchronized playback of the portions of the audio track corresponding to any video frames which are provided for playback. However, because the user may be browsing the video recording by using mouse-over type motions of the mosaic images, playback of the sound corresponding to the selection of particular pixels via the pointer motion or other pixel selection device (i.e., keyboard, mouse, joystick, gamepad, etc.) can be disjointed. Therefore, in one embodiment, the sound track is automatically muted, or the volume level automatically lowered, while the user is moving the pointing device to avoid a choppy or disjointed audio playback corresponding to the displayed image frames. Then, when the cursor becomes stationary for some predetermined period of time, or when the user uses the pointing device to click on or otherwise explicitly select particular pixels of the image mosaic, the sound track will be played at a normal volume along with the corresponding image frames.

In a related embodiment, sound volume is inversely proportional to the speed at which the pointing device (or other pixel selection device) is moving across the image mosaics, so that faster motions will correspond to lower audio volumes, and slower or stopped motions of the pointing device will correspond to louder audio volumes.

In yet another embodiment, the audio track is made to sound "further away" as the pixel selection device moves across the image mosaics increases. For example, in one embodiment, a low-pass filtering is applied to the audio track in combination with the application of a reverb to the audio track. The effect of processing the audio track in this manner is to make the sound seem to be coming from further away. Then, when the pixel selection device slows down, or comes to rest on a particular pixel of the image mosaics, the sound track is then "sharpened up" by gradually removing the filter and reverb.

In still another embodiment, the playback speed of the corresponding audio track is increased relative to the speed of the pixel selection device across the image mosaics. In one embodiment, this speed up is accomplished by simply playing the audio samples at an increased rate. However, in another embodiment, a conventional pitch-preserving speed-up algorithm such as, for example, the well known SOLA (Synchronized Overlap-Add) algorithm, is used to play all the audio corresponding to image frames at an increased rate, while maintaining the original pitch, as nearly as possible.

Clearly each of the aforementioned audio level techniques may be combined into various hybrid embodiments, such as, for example, combining the volume and filtering embodiments; combining the filtering and pitch preserving embodiments; or combining the pitch preserving and volume embodiments.

Figure 3:
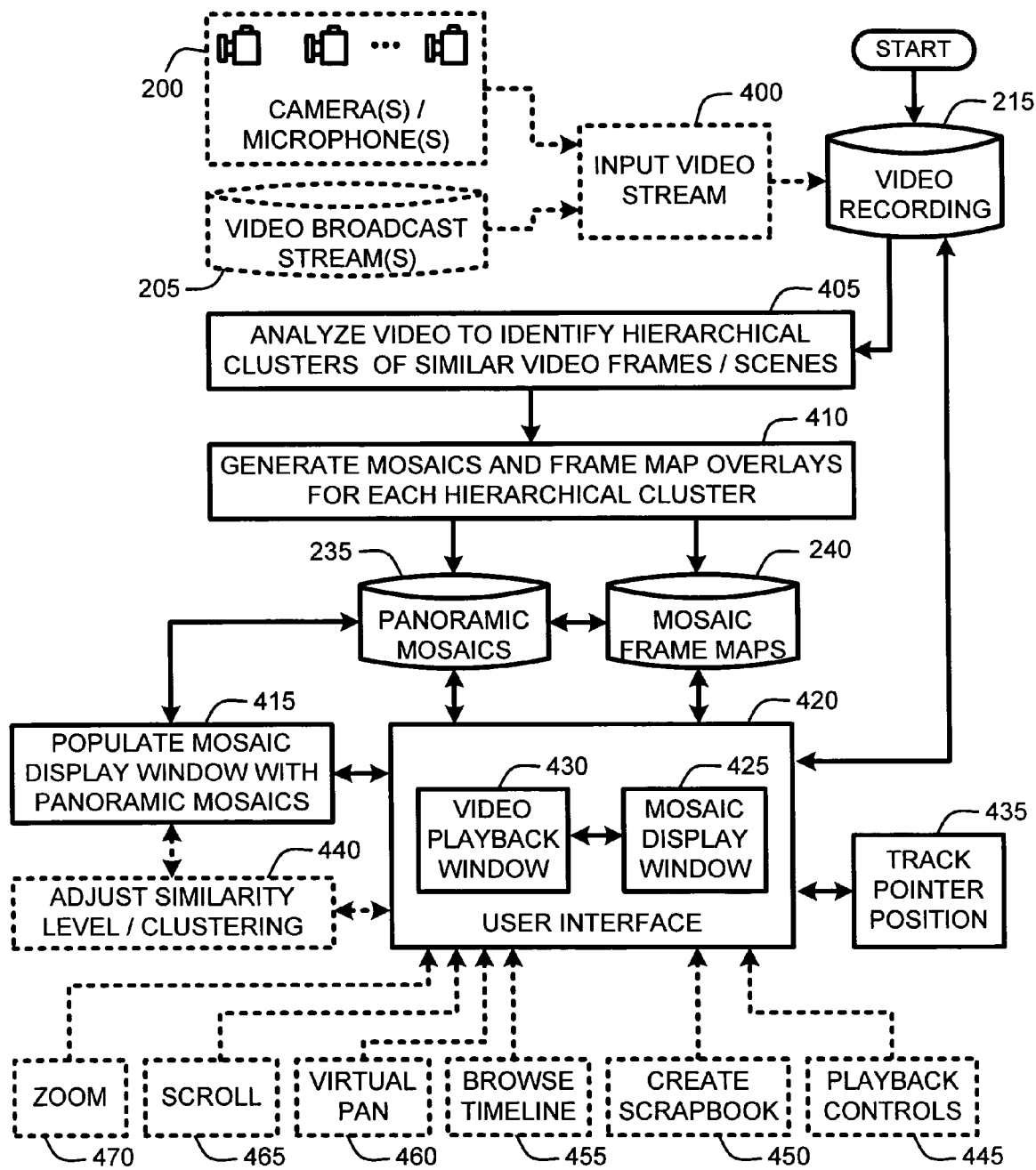
FIG. 3 provides an exemplary flow diagram which illustrates an exemplary operational flow of a user interface for implementing the Video Browser, as described herein.

4.0 Video Browser Operation:

The processes described above with respect to FIG. 2 and in view of the detailed description provided above in Section 3 are summarized by the general operational flow diagram of FIG. 3, which illustrates an exemplary operational flow diagram showing one generic embodiment for implementing the Video Browser.

In particular, as illustrated by FIG. 3, the Video Browser described herein begins operation by first processing a video recording 215 to identify similar scenes in the video recording. As noted above, the video recording 215 can be provided from any conventional source, including one or more video cameras 200 or network video streams 205. Regardless of the source, once the video has been input 400 and saved to a computer readable medium, the video recording 215 is available to the Video Browser for further processing.

In processing the video recording 215 to identify similar scenes, the video is analyzed 405 to identify clusters of similar video frames. As described above, in one embodiment, these clusters are hierarchical so that the level of clustering may be expanded or collapsed by adjusting a similarity threshold.

Next, as illustrated in box 410, given the set of one or more clusters, the Video Browser generates mosaics 235 and corresponding frame maps for each cluster. As noted above, in the case where hierarchical clustering is used, the panoramic mosaics 235 are generated for each of the clusters at each level of clustering. This allows for real-time expansion and collapse of clusters without the need to perform clustering and mosaicing operations as the user browses the video recording 215 via the Video Browser interface described herein.

Given the panoramic mosaics 235 and the corresponding mosaic frame maps, the Video Browser then populates 415 a mosaic display window 425 of a user interface 420 with the panoramic mosaics. As described above, the mosaic frame maps 240 provide a reverse mapping from each pixel of the panoramic mosaic 235 to each of the video frames of the video recording 215 that contributed to that pixel in the mosaic. In one embodiment, this frame mapping information is included as metadata embedded directly into each of the panoramic mosaics 235. Alternately, as illustrated by FIG. 3, it is provided as a separate overlay. The effect is the same in either case, in that each pixel of each mosaic is user selectable, and each of those selectable pixels points back to one or more frames of the original video recording.

Once the mosaic display window 425 has been populated 415 with the panoramic mosaic images 235, video playback is initiated within a video playback window 430 via user selection or designation of any pixel of any of the displayed panoramic mosaic images 235. In one embodiment, pixel selection is accomplished by "clicking on" or otherwise selecting a particular pixel of one of the mosaic images. Alternately, it has been observed that a more intuitive user experience is provided by simply tracking 435 the pointer position across the mosaic display window 425 as the user moves the pointing device across the panoramic mosaics displayed in the mosaic display window. Playback of corresponding video frames is then initiated based on the current position of the pointer relative to the one of the panoramic mosaics 235.

As discussed in greater detail above, in various embodiments, the user interface 420 provides a number of additional controls for further enhancing the user browsing experience. For example, in one embodiment, the user is provided with the capability to adjust the similarity level, either explicitly (such as by specifying a threshold or score for measuring similarity, or implicitly (such as by adjusting a slider bar, or the like, for increasing or decreasing the amount of clustering (and thus the number of corresponding panoramic mosaics 235 displayed in the mosaic display window 425).

Also as described in greater detail above, the user interface 420, includes other embodiments, including, for example: conventional video playback controls 445; the ability to create video scrapbooks by selecting particular panoramic mosaic images 235 from one or more unique video recordings 215; the ability to directly browse the video through selection of a video timeline display; the ability to virtually pan through the video as a joint function of time and space through tracking of the pointer position; the ability to scroll through the mosaic images in the mosaic display window 425; and the ability to zoom in or out with respect to one or more of the mosaic images in the mosaic display window.

Figure 4:
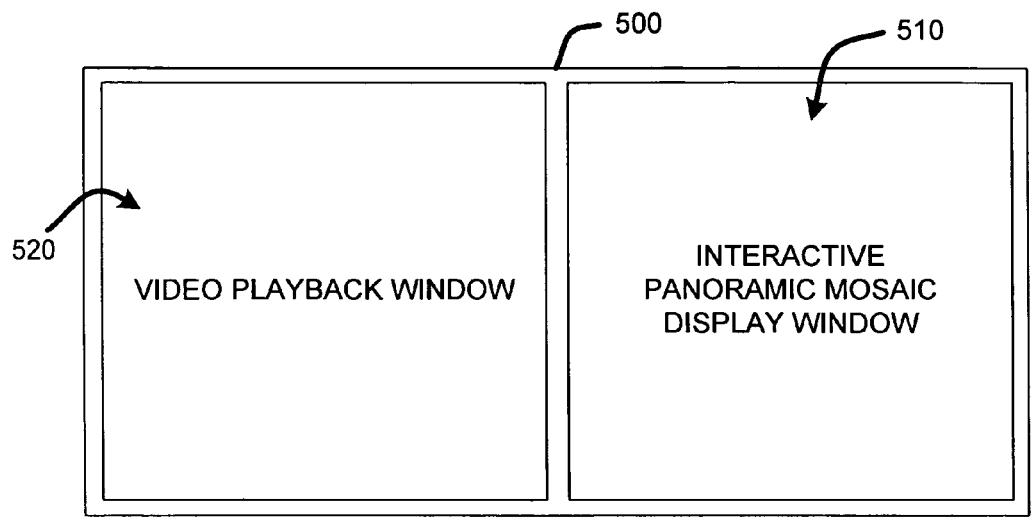
FIG. 4 illustrates a schematic representation of one possible layout of a graphical user interface provided by the Video Browser described herein.

4.1 Exemplary Video Browser User Interface:

FIG. 4 illustrates a schematic representation of one possible layout of the graphical user interface provided by the Video Browser described herein. In particular, in the simplest implementation, the Video Browser 500 user is presented to the user as only two windows, an interactive panoramic mosaic display window 510, and a video playback window 520. User selection of particular pixels of any of the panoramic mosaic images displayed within the interactive panoramic mosaic display window 510 immediately initiates a playback of the corresponding image frames in the video playback window 520. As described above, the corresponding frames are defined as the frames that belong to the cluster and contain the scene element that the user's selection device is hovering over in the panoramic representation. Alternatively, frame correspondence is defined only by cluster correspondence. Another alternative is to retrieve frames in temporal proximity to the frames that contain the selected scene element. A tested version of this simple embodiment was implemented on a touch screen display for browsing particular scenes of a lengthy video recording by simply selecting different points of the various panoramic mosaic images displayed within the interactive panoramic mosaic display window 510 using a handheld stylus-type pointer device.

Figure 5:
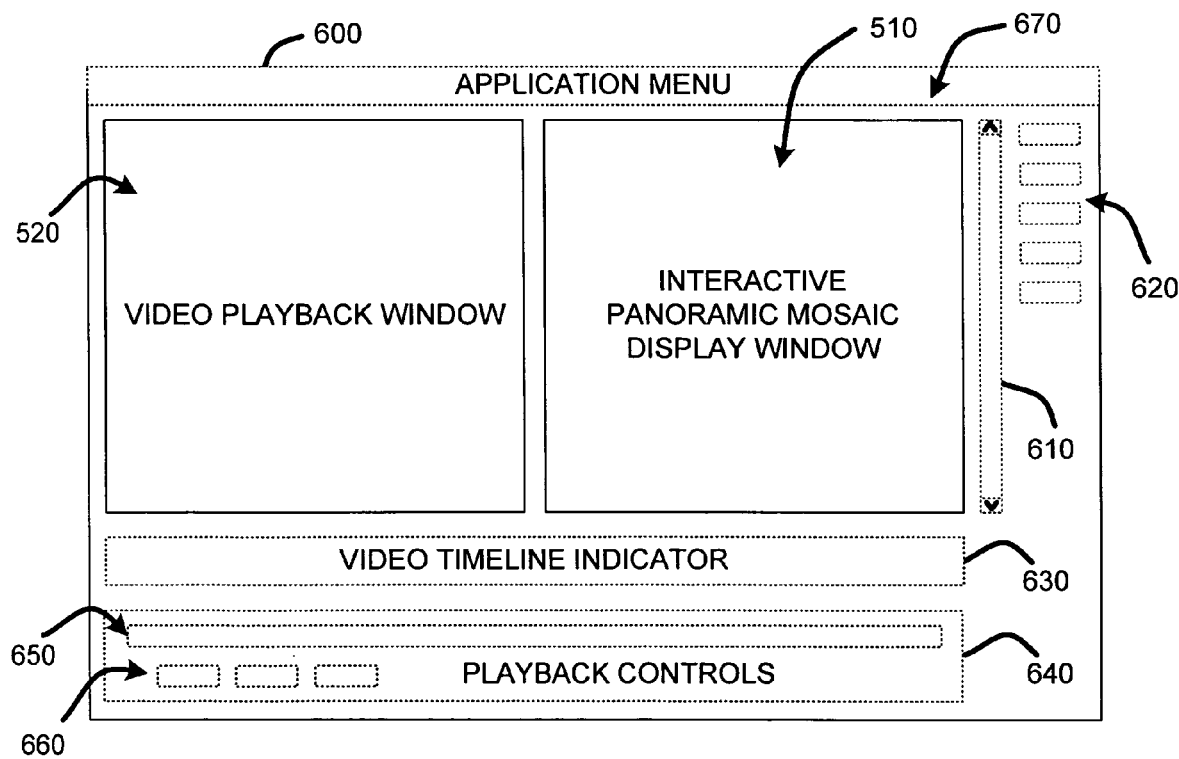
FIG. 5 illustrates a schematic representation of one possible layout of the graphical user interface provided by the Video Browser described herein.

FIG. 5 illustrates a schematic representation of another possible layout of the graphical user interface provided by the Video Browser described herein. Note that FIG. 5 shows a number of alternate embodiments, as illustrated by dashed lines, and that any or all of these alternate embodiments, as described below, may be used in combination with other alternate embodiments that are described throughout this document.

In particular, as illustrated by FIG. 5, the Video Browser described herein may be implemented using some or all of the various embodiments described herein. For example, in addition to the interactive panoramic mosaic display window 510, and the video playback window 520, additional embodiments of the user interface 600 of the Video Browser may also include a scroll bar 610, or the like, for scrolling through a set of panoramic mosaic images that are either too large, or too many to be simultaneously displayed within the interactive panoramic mosaic display window 510.

Further embodiments of the user interface 600 of the Video Browser may include one or more controls 620 relating the displayed panoramic mosaic images. For example, as described above, such controls 620, include any or all of the capability to zoom, pan, add, delete, expand, collapse, etc., any one or more of the displayed panoramic mosaic images. Still further embodiments of the user interface 600 of the Video Browser include video playback controls 640, such as, for example, a slider-type control 650 for playing back a particular part of the video recording, or other controls 660, such as, for example, controls for playing, pausing, or stopping, etc. playback of the video recording. In addition, an application menu 670 may also be included for implementing or accessing any of the features of the user interface of the Video Browser described herein.

Finally, in still another embodiment of user interface 600 of the Video Browser, a video timeline indicator 620 is provided for indicating the relative temporal position of the video frames that correspond to a selected pixel or region of one of the displayed panoramic mosaic images. Note that this particular embodiment is illustrated in a screen print of a tested embodiment of the Video Browser provided as FIG. 6. The selection device may be used to select the frames directly from the timeline indicator 620, in which case the corresponding cluster in box 670 may be immediately highlighted, allowing the user to quickly search for related scenes by directing the selection device to the scene elements of interest in the cluster.

Figure 6:
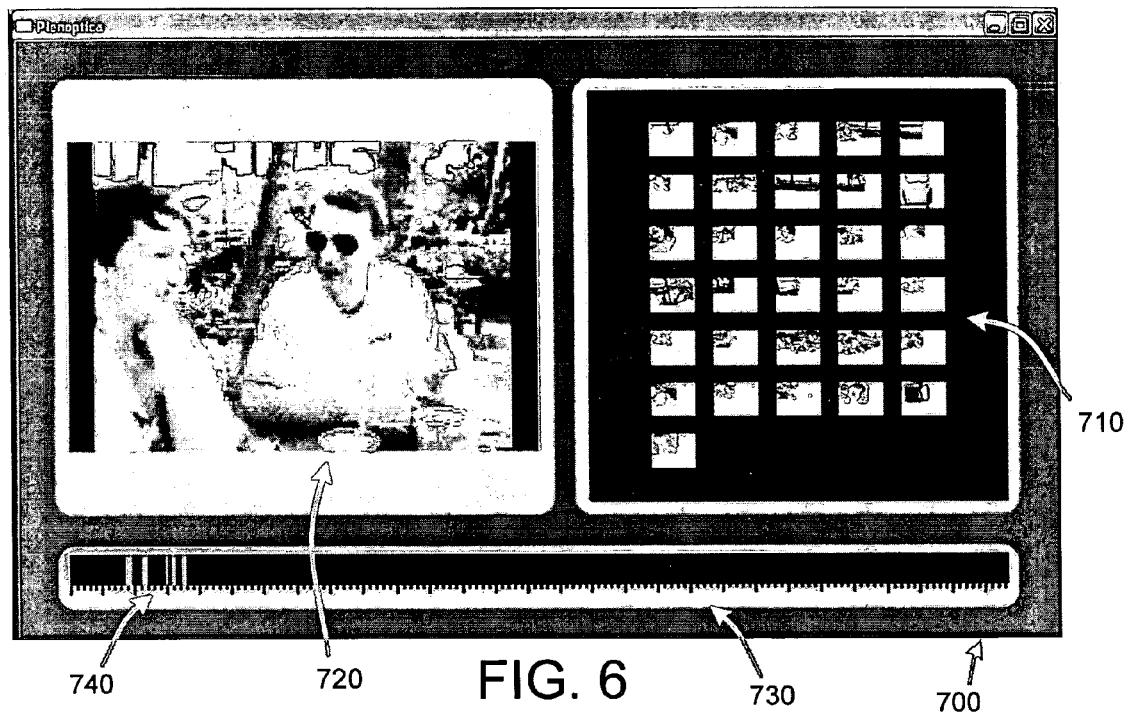
FIG. 6 illustrates a screen print of a tested embodiment of a user interface provided by the Video Browser illustrated in FIG. 5.
Figure 7:
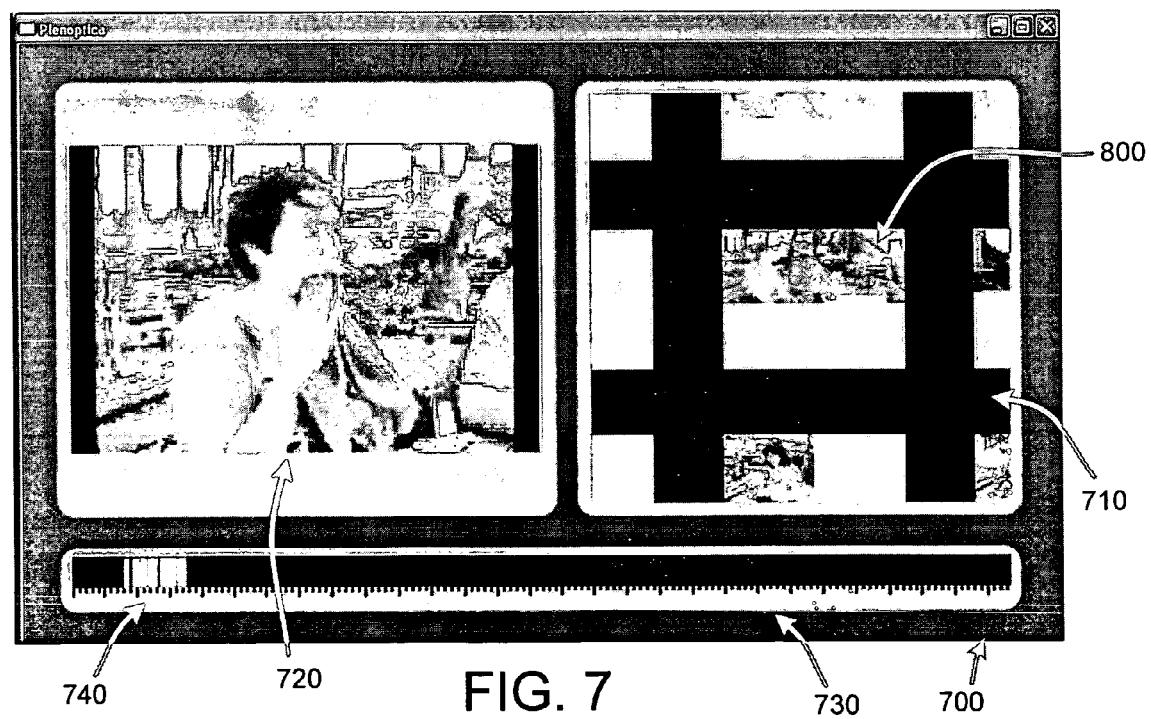
FIG. 7 illustrates a screen print of a tested embodiment of a user interface provided by the Video Browser illustrated in FIG. 5.
Figure 8:
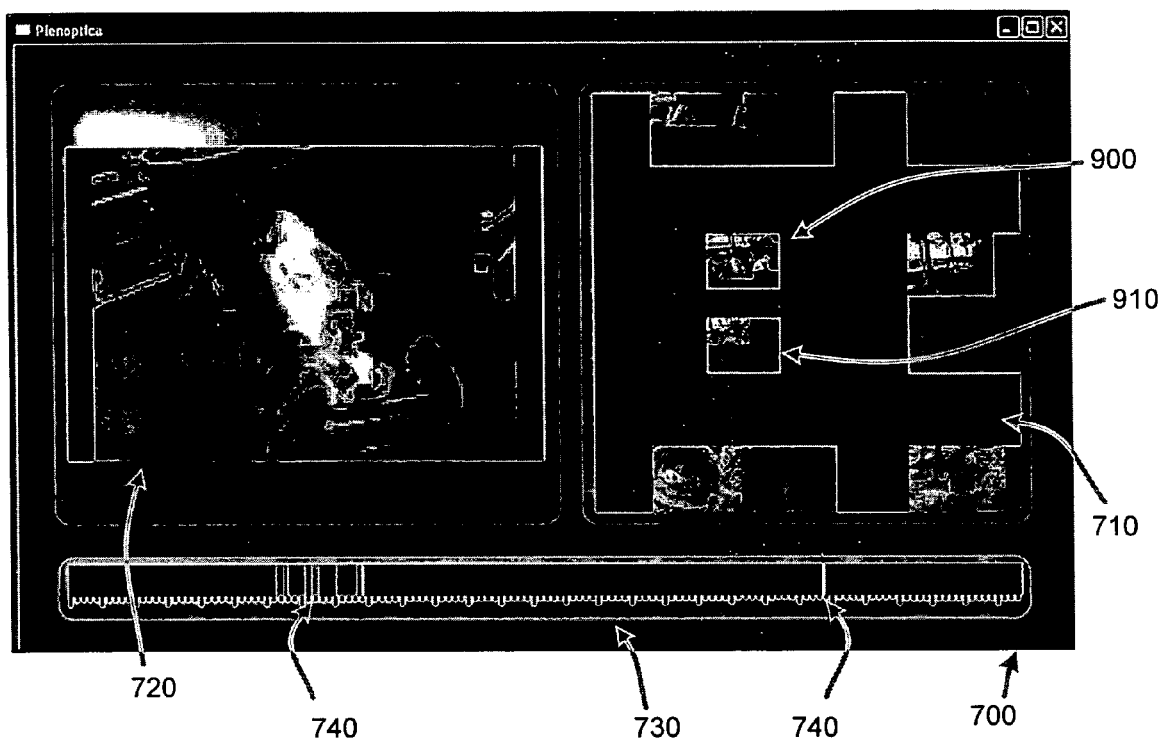
FIG. 8 illustrates a screen print of a tested embodiment of a user interface provided by the Video Browser illustrated FIG. 5.

4.1.1 Screen Prints of Tested Embodiments of the Video Browser UI:

Several features of the Video Browser user interface, as described above, are illustrated by the screen prints of FIGS. 6, 7, and 8, which illustrate one simple example of a tested embodiment of the Video Browser user interface described herein.

In particular, as illustrated by FIG. 6, one implementation of the Video Browser user interface 700, includes an interactive panoramic mosaic display window 710, a video playback window 720, and a video timeline indicator 730 for indicating the relative temporal position (highlighted vertical bars 740) of the video frames that correspond to a selected pixel or region of one of the displayed panoramic mosaic images. As illustrated by FIG. 6, the interactive panoramic mosaic display window 710 includes a set of thumbnail panoramic mosaic images laid out in a regular arrangement. The video playback window 720 illustrates a currently playing image frame corresponding to a pixel in a selected one of the thumbnail panoramic mosaic images.

Note that in one embodiment, the relative position of the currently playing video frame is further highlighted relative to the already highlighted relative positions 740 of the remaining video frames. In other words, while the relative position of all of the image frames corresponding to the selected pixel in the selected one of the thumbnail panoramic mosaic images, are highlighted, the relative position of the currently playing image frame is further highlighted so as to alert the user to the relative position of each image frame as it is played in the video playback window 720.

FIG. 7 illustrates another view of the user interface 700 of FIG. 6. In particular, in the screen print provided as FIG. 7, the user has zoomed into one of the panoramic image mosaics 800 provided in the interactive panoramic mosaic display window 710. Note that in one embodiment, zooming was accomplished using a context sensitive type menu (not illustrated) that appears in response to a user "right-click" type pointer action. Alternately, in a related embodiment, this zooming functionality was tied to particular keyboard keys, so that pressing particular keys provided that same zooming functionality provided via the pointer action described above.

Finally, FIG. 8 illustrates another view of the user interface 700 of FIG. 6. In particular, in the screen print provided as FIG. 8, the user has expanded the clustering of one of the panoramic images into two separate panoramic images zoomed into one of the panoramic image mosaics 900 and 910. Note that in one embodiment, zooming was again accomplished using a context sensitive type menu (not illustrated) that appears in response to a user "right-click" type pointer action. Alternately, in a related embodiment, this zooming functionality was tied to particular keyboard keys, so that pressing particular keys provided that same zooming functionality provided via the pointer action described above.

The foregoing description of the Video Browser has been presented for the purposes of illustration and description. It is not intended to be exhaustive or to limit the invention to the precise form disclosed. Many modifications and variations are possible in light of the above teaching. Further, it should be noted that any or all of the aforementioned alternate embodiments may be used in any combination desired to form additional hybrid embodiments of the Video Browser. It is intended that the scope of the invention be limited not by this detailed description, but rather by the claims appended hereto.

What is claimed is:

1. A computer-readable storage medium having computer executable instructions stored therein for providing an interactive graphical user interface for browsing a video recording, said computer executable instructions comprising:

analyzing a video recording to identify one or more clusters of similar image scenes, with each image scene comprising at least one image frame;

generating a panoramic image mosaic for each cluster of similar image scenes;

constructing a corresponding frame map for each panoramic image mosaic, wherein each frame map provides a reverse mapping from each pixel of the panoramic image mosaic to every corresponding image frame of the video recording from which the pixel of the panoramic image mosaic was generated;

displaying one or more of the panoramic image mosaics within a first display window of a graphical user interface, and overlaying the corresponding frame maps on each of the displayed panoramic image mosaics;

tracking user selection of pixels of the displayed panoramic image mosaics; and initiating a playback in a second display window of the graphical user interface of image frames corresponding to the user selected pixels with respect to the corresponding overlaid frame map.

2. The computer-readable storage medium of claim 1 wherein displaying one or more of the panoramic image mosaics within the first display window comprises displaying a panel comprised of a plurality of image mosaics which jointly represent at least a portion of the entirety of the video recording.

3. The computer-readable storage medium of claim 1 wherein identifying one or more clusters of similar image scenes comprises determining a hierarchical similarity of the image scenes such that the clusters are identified at each of a plurality of hierarchical similarity levels.

4. The computer-readable storage medium of claim 3 further comprising a user interface control for expanding one or more of the panoramic image mosaics to display a plurality of related panoramic image mosaics representing clusters of similar image scenes at a lower level of the hierarchical similarity levels.

5. The computer-readable storage medium of claim 3 further comprising a user interface control for collapsing two or more of the panoramic image mosaics into a single panoramic image mosaic representing a cluster of similar image scenes at a higher level of the hierarchical similarity levels.

6. The computer-readable storage medium of claim 3 further comprising a user adjustable similarity threshold for automatically adjusting a current hierarchical similarity level of clusters of similar image scenes, thereby automatically adjusting the display of corresponding panoramic image mosaics within the first display window.

7. The computer-readable storage medium of claim 1 further comprising a user interface control for zooming a selected part of one or more panoramic image mosaics in the first display window of the graphical user interface.

8. The computer-readable storage medium of claim 1 wherein displaying one or more of the panoramic image mosaics within a first display window of the graphical user interface comprises arranging each of the panoramic image mosaics in a scrollable display window.

9. The computer-readable storage medium of claim 1 further comprising a timeline display window within the graphical user interface for simultaneously highlighting a relative temporal position of each of the image frames corresponding to the user selected pixels with respect to the corresponding overlaid frame map.

10. The computer-readable storage medium of claim 8 further comprising additionally highlighting the relative temporal position of the currently playing image frame relative to the other highlighted relative positions of the image frames.

11. The computer-readable storage medium of claim 1 further comprising a video position slider bar for indicating a current playback position of the video recording.

12. The computer-readable storage medium of claim 11 wherein the video position slider bar provides for real-time adjustment of the current playback position of the video recording.

13. The computer-readable storage medium of claim 1 further comprising a control for creating and displaying a subset of panoramic mosaic images and corresponding frame maps from one or more video recordings to create an interactive video scrapbook.

14. The computer-readable storage medium of claim 1 further comprising automatically muting a playback of a sound track corresponding to the image frames corresponding to the user selected pixels while a pixel selection device is being moved relative to the pixels of the displayed panoramic image mosaics.

15. The computer-readable storage medium of claim 1 further comprising automatically varying a volume level of a sound track corresponding to the image frames corresponding to the user selected pixels in inverse proportion to the speed of the pixel selection device relative to the pixels of the displayed panoramic image mosaics.

16. The computer-readable storage medium of claim 14 further comprising automatically increasing a volume level of the sound track of the video recording whenever the pixel selection device is stationary relative to the to the pixels of the displayed panoramic image mosaics.

17. A system for providing interactive content-based browsing and playback of a video recording, comprising:
   means for generating a set of hierarchically clustered panoramic image mosaics from similar scenes of the video recording, wherein each panoramic image mosaic includes a user selectable frame map overlay which identifies each image frame of the video recording that contributed to each pixel of each corresponding panoramic image mosaic;
   means for displaying the panoramic image mosaics with a first window of a graphical user interface;
   means for selecting a subset of one or more pixels of one of the displayed panoramic image mosaics; and
   means for providing a playback of the image frames of the video recording corresponding to the user selected pixels relative to the corresponding frame map.

18. The system of claim 17 wherein selecting the subset of one or more pixels of one of the displayed panoramic image mosaics comprises means for continuously tracking a position of a pixel selection device relative to the pixels of the displayed panoramic image mosaics, and automatically selecting at least one pixel corresponding to a current pixel selection device position.

19. The system of claim 17 wherein generating the set of hierarchically clustered panoramic image mosaics from the video recording comprises means for generating panoramic image mosaics at each of a plurality of hierarchical similarity levels.

20. The system of claim 19 further comprising a user interface control for expanding one or more of the panoramic image mosaics to display a plurality of related panoramic image mosaics representing clusters of similar image scenes at a lower level of the hierarchical similarity levels.

21. The system of claim 19 further comprising a user interface control for collapsing two or more of the panoramic image mosaics into a single panoramic image mosaic representing a cluster of similar image scenes at a higher level of the hierarchical similarity levels.

22. The system of claim 19 further comprising a user adjustable similarity threshold for automatically adjusting a current hierarchical similarity level of clusters of similar image scenes, thereby automatically adjusting the display of corresponding panoramic image mosaics within the first window of the graphical user interface.

23. The system of claim 17 further comprising a user interface control for zooming a selected part of one or more panoramic image mosaics in the first window of the graphical user interface.

24. The system of claim 17 wherein the first window is scrollable to provide user browsing of the displayed panoramic image mosaics.

25. The system of claim 17 further comprising a timeline display window within the graphical user interface for simultaneously highlighting a relative temporal position of each of the image frames corresponding to the user selected pixels with respect to the corresponding overlaid frame map.

26. The system of claim 17 further comprising a user interface control for creating and displaying a subset of panoramic mosaic images from one or more video recordings to create an interactive video scrapbook for browsing selected portions of the one or more video recordings via the user selectable frame map overlays corresponding to each panoramic image mosaic.

27. A computer-implemented process for joint temporal-spatial browsing of video recordings via an interactive graphical user interface, comprising using a computing device for:
   analyzing a video recording to identify one or more hierarchical clusters of similar image scenes at each of a plurality of hierarchical similarity levels, with each image scene comprising at least one image frame;
   generating a panoramic image mosaic for each cluster, and wherein each panoramic image mosaic includes a user selectable pixel-based frame map overlay which provides a reverse mapping from each pixel of the panoramic image mosaic to every corresponding image frames of the video recording from which each pixel of the panoramic image mosaics were generated;
   displaying one or more of the panoramic image mosaics within a first display window of a graphical user interface;
   selecting one or more pixels of the panoramic image; and
   providing a playback of the image frames of the video recording corresponding to the selected pixels relative to the corresponding frame map.

28. The computer-implemented process of claim 27 wherein the graphical user interface further includes a control for expanding one or more of the panoramic image mosaics to display a plurality of related panoramic image mosaics representing clusters of similar image scenes at a lower level of the hierarchical similarity levels.

29. The computer-implemented process of claim 27 wherein the graphical user interface further includes a control for collapsing two or more of the panoramic image mosaics into a single panoramic image mosaic representing a cluster of similar image scenes at a higher level of the hierarchical similarity levels.

30. The computer-implemented process of claim 27 further comprising a user adjustable similarity threshold for automatically adjusting a current hierarchical similarity level of clusters of similar image scenes, thereby automatically adjusting the display of corresponding panoramic image mosaics within the first display window.

31. The computer-implemented process of claim 27 wherein the graphical user interface further includes a control for zooming a selected part of one or more panoramic image mosaics in the first display window of the graphical user interface.

32. The computer-implemented process of claim 27 further comprising a timeline display window within the graphical user interface for simultaneously highlighting a relative temporal position of each of the image frames corresponding to the selected pixels relative to the corresponding frame map.

33. The computer-implemented process of claim 27 wherein the graphical user interface further includes a control for selecting and displaying a subset of panoramic mosaic images from one or more separate video recordings to create an interactive video scrapbook for browsing selected portions of the one or more separate video recordings via the user selectable pixel-based frame map overlay corresponding to each panoramic image mosaic.

34. The computer-implemented process of claim 27 wherein displaying one or more of the panoramic image mosaics within the first display window comprises displaying a panel comprised of a plurality of image mosaics which jointly represent at least a portion of the entirety of the video recording.

35. A method in a computer system for browsing a video recording via a user interface, comprising using a computer to perform the following steps:
    a step for populating a first display window with at least one panoramic image mosaic, each panoramic image mosaic being generated from a cluster of similar frames identified in a video recording;
    a step for assigning a map overlay to each panoramic image mosaic, said map overlay providing a reverse mapping from each pixel of each panoramic image mosaic to each corresponding image frame of the cluster similar frames from which each pixel of the panoramic image mosaic was generated; and
    a step for initiating a playback of image frames of the video recording in a second display window, said image frames corresponding to selected pixels of one of the panoramic image mosaics relative to the corresponding map overlay.

36. The method of claim 35 wherein the selection of pixels of one of the panoramic image mosaics comprises a step for monitoring pixel selection device movements relative to displayed pixels of the panoramic image mosaics, and selecting pixels proximate to a current position of the pixel selection device.

37. The method of claim 35 further comprising a step for identifying hierarchical clusters of similar frames at each of a plurality of hierarchical frame similarity levels, said hierarchical clusters used as the clusters for generating the panoramic image mosaics at each hierarchical similarity level.

38. The method of claim 37 further comprising a step for expanding one or more of the panoramic image mosaics into a subset of panoramic image mosaics corresponding to each hierarchical frame similarity level of the corresponding hierarchical cluster.

39. The method of claim 37 further comprising a step for collapsing two or more of the panoramic image mosaics into one or more panoramic image mosaics corresponding to a selected hierarchical frame similarity level of the corresponding hierarchical clusters.

40. The method of claim 36 further comprising a step for automatically muting a sound track of the video recording while the pixel selection device is being moved relative to the displayed pixels of the panoramic image mosaics.

41. The method of claim 36 further comprising a step for automatically varying a volume level of a sound track of the video recording in inverse proportion to the speed at which the pixel selection device is being moved relative to the displayed pixels of the panoramic image mosaics.

42. The method of claim 40 further comprising a step for automatically increasing a volume level of the sound track of the video recording whenever the pixel selection device is stationary relative to the displayed pixels of the panoramic image mosaics.

43. The method of claim 36 further comprising a step for automatically filtering a sound track of the video recording as a function of the motion of the pixel selection device relative to the displayed pixels of the panoramic image mosaics.

44. The method of claim 36 further comprising a step for automatically changing the speed of a playback of a sound track of the video recording as a function of the motion of the pixel selection device relative to the displayed pixels of the panoramic image mosaics.

45. The method of claim 44 wherein the step for automatically changing the speed of the playback further includes a step for applying a pitch-preserving speed change to the playback of the sound track.

* * * * *